United States Patent
Fam

(10) Patent No.: US 8,271,572 B2
(45) Date of Patent: Sep. 18, 2012

(54) GENERATING PARTIAL SUMS

(75) Inventor: Adly T. Fam, East Amherst, NY (US)

(73) Assignee: The Research Foundation of State University of New York, Amherst, NY (US)

( * ) Notice: Subject to any disclaimer, the term of this patent is extended or adjusted under 35 U.S.C. 154(b) by 0 days.

(21) Appl. No.: 13/059,820

(22) PCT Filed: Oct. 14, 2009

(86) PCT No.: PCT/US2009/060705
§ 371 (c)(1),
(2), (4) Date: Mar. 31, 2011

(87) PCT Pub. No.: WO2010/045378
PCT Pub. Date: Apr. 22, 2010

(65) Prior Publication Data
US 2011/0202585 A1    Aug. 18, 2011

Related U.S. Application Data

(60) Provisional application No. 61/105,173, filed on Oct. 14, 2008.

(51) Int. Cl.
*G06F 7/50* (2006.01)
(52) U.S. Cl. .................................................... 708/709
(58) Field of Classification Search ................. None
See application file for complete search history.

(56) References Cited

U.S. PATENT DOCUMENTS

| | | |
|---|---|---|
| 4,719,590 A | 1/1988 | Aman |
| 4,942,548 A | 7/1990 | Vassiliadis |
| 5,719,803 A | 2/1998 | Naffziger |
| 5,777,918 A | 7/1998 | Chan et al. |
| 5,978,827 A * | 11/1999 | Ichikawa ............... 708/709 |
| 6,182,105 B1 | 1/2001 | Kolagotla et al. |
| 6,219,688 B1 * | 4/2001 | Guttag et al. ............ 708/709 |
| 6,223,198 B1 | 4/2001 | Oberman et al. |
| 6,826,588 B2 | 11/2004 | Bhushan et al. |
| 6,839,729 B2 | 1/2005 | Pham |
| 7,051,062 B2 * | 5/2006 | Jalfon ....................... 708/709 |

(Continued)

OTHER PUBLICATIONS

International Preliminary Report on Patentability and Written Opinion; Patent Cooperation Treaty, PCT application No. PCT/US2009/060705; Date of issuance Apr. 19, 2011; 5 pages.

(Continued)

*Primary Examiner* — David H Malzahn
(74) *Attorney, Agent, or Firm* — Fish & Richardson P.C.

(57) ABSTRACT

A method for generating partial sums from at least four multiple-digit sequences in a computing device includes partitioning the multiple-digit sequences into at least a first set of multiple-digit sequences and a second set of multiple-digit sequences. The method also includes generating at least one auxiliary set of multiple-digit sequences. The auxiliary set includes digits copied from respective digit positions of multiple-digit sequences in the first and second sets. The method further includes replacing the copied digits in the first and second sets by zeros to obtain a first altered set and a second altered set, respectively, of multiple-digit sequences each comprising multiple segments separated by the replaced zeros. The method also includes generating at least a first partial sum by adding the multiple-digit sequences in at least one auxiliary set and generating at least a second and third partial sums by adding the multiple-digit sequences in the first altered set and second altered set, respectively.

24 Claims, 10 Drawing Sheets

U.S. PATENT DOCUMENTS

| | | | |
|---|---|---|---|
| 7,293,056 B2* | 11/2007 | Sheaffer | 708/709 |
| 2003/0093454 A1* | 5/2003 | Combes et al. | 708/629 |
| 2004/0153490 A1 | 8/2004 | Talwar et al. | |
| 2005/0228845 A1 | 10/2005 | Pius Ng et al. | |
| 2006/0064455 A1 | 3/2006 | Schulte et al. | |
| 2006/0212505 A1 | 9/2006 | Islam | |
| 2006/0282487 A1 | 12/2006 | Papadantonakis et al. | |
| 2007/0124562 A1 | 5/2007 | Johnson et al. | |
| 2007/0180015 A1 | 8/2007 | Cho et al. | |

OTHER PUBLICATIONS

International Search Report and Written Opinion from corresponding PCT Application No. PCT/US2009/060705, mailed May 7, 2010, 11 pp.

Pourbigharaz et al., "A Signed-Digit Architecture for Residue to Binary Transformation", IEEE Transactions on Computers, 46(10):1146-1150, (1997).

Phatak et al., "Hybrid Signed-Digit Number Systems: A Unified Framework for Redundant No. Representations with Bounded Carry Propagation Chains", IEEE Transactions on Computers 43(8):880-891, (1994).

Parhami, "Carry-Free Addition of Recoded Binary Signed-Digit Numbers", IEEE Transactions on Computers, 37 (11):1470-1476, (1988).

Wallace, "A Suggestion for a Fast Multiplier", IEEE Trans. Electron. Comput., 13:14-17, (1964).

Thomas Poonnen and Adly T Fam, "A Novel VLSI Divide and Conquer Implementation of Iterative Array Multiplier," 4th Int'l Conf. on Information Technology: New Generations (ITNG 2007), Las Vegas, pp. 723-728, (2007).

Thomas Poonnen and Adly T Fam, "A Novel VLSI Divide and Conquer Array Architecture for Vector-Scalar Multiplication" The International Conference on Integrated Circuit Design and Technology (ICICDT07) Austin, Texas, pp. 1-4, (2007).

Parandeh-Afshar et al., "A Novel FPGA Logic Block for Improved Arithmetic Performance", EPFL School of Computer and Communication Sciences, 171-180, (2008).

Das et al., "A Novel Hybrid Prallel-Prefix Adder Architecture with Efficient Timing-Area Characteristic", IEEE Transactions on Very Large Scale Integration (VLSI) Systems, 16(3):326-331, (2008).

Ling, "High Speed Binary Parallel Adder", IEEE transactions on Electronic Computers, Short Notes, 799-802 (1966).

Ling, "High Speed Binary Adder", IBM J. Res. Develop., 25(3):156-166, (1981).

Vergos et al., "Efficient Modulo 2n+1 Adder Architectures", Integration VLSI J., 42(2):149-157, (2009).

Ercegovac et al., "Digital Arithmetic", The Morgan Kaufmann Series in Computer Architecture and Design, Chapter (2), pp. 51-77, (2003).

Ercegovac et al., "Digital Arithmetic", The Morgan Kaufmann Series in Computer Architecture and Design, Chapter (3), pp. 137-159, (2003).

Choi et al., "Speculative Carry Generation with Prefix Adder", IEEE Transactions on Very Large Scale Integration (VLSI) Systems, 16(3):321-326, (2008).

* cited by examiner

GENERATING PARTIAL SUMS

CROSS REFERENCE TO RELATED APPLICATION

This application is the U.S. national stage under 35 USC §371 of International Application Number PCT/US2009/060705, filed Oct. 14, 2009, which claims priority to U.S. Application No. 61/105,173 filed on Oct. 14, 2008, the entire contents of which applications are hereby incorporated by reference.

TECHNICAL FIELD

This description relates to generating partial sums, e.g., in adders used in computer hardware.

BACKGROUND

The carry operation in different fast adders are handled in a number of ways. In general, when numbers of a given length are added together, the sum may be of length greater than the individual length of each number. Consider adding two binary numbers 11+11. Addition of the right most bits (the lowest order bit position), i.e. 1+1 results in 10. While the 0 is stored in the corresponding bit position of the result, the 1 is referred to as a 'carry' which must be added to the sum of the bits in the next higher bit position. In this example, the 1 is added to 1+1, i.e., the sum of the digits in the next bit position, giving the final result of 110. In computer arithmetic, accounting for the carry in the next higher position is known as propagation of carry.

Various designs of fast adders could be differentiated based on their handling of the carry propagation. For example, some adders divide the bits of numbers to be added into multiple segments that are added in parallel, and then combine the sums of the segments to generate a final result. Each segment can consist of a single bit or multiple bits. The carry-select adder is an example of such an adder. In this adder, the carry from the most significant bit of one segment is propagated to the least significant bit of the next most significant segment. For example, the circuitry for adding a given segment in the carry select adder generally consists of two adders and one multiplexer. Adding two n-bit numbers with a carry select adder is done with two adders for each segment in order to perform the calculation twice, one time with the assumption of the carry being 0 and the other assuming 1. After the two results are calculated the correct sum, as well as the correct carry, are then selected with the multiplexer once the correct carry is known. This is repeated for every segment, with the correct carry result being propagated from one segment to the next. While performance can be increased by performing the two sums for each segment in parallel (e.g., dividing the time approximately by the number of segments), there may also be a cost since the addition for each segment is performed twice (e.g., a cost in area on a chip for the extra adder for each segment). Also, additional time is needed to propagate the carry result among the segments.

When adding two or more numbers of n-bits, the carry save adder outputs two n-bit numbers, one which is a sequence of partial sum bits and another which is a sequence of carry bits. For example, consider the binary sum 1101+1111. Carry-save arithmetic works by abandoning the binary notation while still working to base 2. It computes the sum digit by digit, as:

$$\begin{array}{r}1101\\+1111\\\hline 2212\end{array}$$

As seen above, the carry save adder produces a result that has to be converted back into binary and this means that carries have to propagate from right to left. The carry-save adder is typically used in adding more than two numbers, i.e. as a multi-operand adder, to justify the cost of converting the saved non-binary carries to binary, and finally adding them to the computed sum to get the final result.

In some cases a carry look ahead adder may be used to reduce the delay associated with a carry save adder. In principle the delay can be reduced so that it is proportional to log(b) where b is the number of bits in each summand, but for large numbers this is no longer the case, because even when carry look-ahead is implemented, the distances that signals have to travel on the chip increases proportionally with b, and propagation delays increase at the same rate.

SUMMARY

In one aspect, a method for generating partial sums from at least four multiple-digit sequences in a computing device includes partitioning the multiple-digit sequences into at least a first set of multiple-digit sequences and a second set of multiple-digit sequences. The method also includes generating at least one auxiliary set of multiple-digit sequences. The auxiliary set includes digits copied from respective digit positions of multiple-digit sequences in the first and second sets. The method further includes replacing the copied digits in the first and second sets by zeros to obtain a first altered set and a second altered set, respectively, of multiple-digit sequences each comprising multiple segments separated by the replaced zeros. The method also includes generating at least a first partial sum by adding the multiple-digit sequences in at least one auxiliary set and generating at least a second and third partial sums by adding the multiple-digit sequences in the first altered set and second altered set, respectively.

In another aspect, a method of generating partial sums from at least four multiple-digit sequences in a computing device includes partitioning the multiple-digit sequences into at least a first set of multiple-digit sequences and a second set of multiple-digit sequences and generating at least a first partial sum and a second partial sum. The first and second partial sums are generated by adding respective segments of the multiple-digit sequences in the first set and second set, respectively, with two or more sets of segments of multiple-digit sequences being added in parallel. The method may also include generating at least one auxiliary set of multiple-digit sequences that include digits derived from respective carry results from additions of respective segments of the multiple-digit sequences in the first set and second sets.

In another aspect, a system for generating partial sums from at least four multiple-digit sequences in a computing device includes a first circuitry and a second circuitry. The first circuitry is configured to partition the multiple-digit sequences into at least a first set of multiple-digit sequences and a second set of multiple-digit sequences and generate at least one auxiliary set of multiple-digit sequences that include digits copied from respective digit positions in the first and second sets. The first circuitry is further configured to replace the copied digits in the first and second sets by zeros to obtain a first altered set and a second altered set, respectively, of multiple-digit sequences each comprising multiple segments separated by the replaced zeros. The second circuitry is configured to generate at least a first partial sum by adding the multiple-digit sequences in the at least one auxiliary set. The second circuitry is also configured to generate at least a second partial sum and a third partial sum by adding the multiple-digit sequences in the first altered set and second altered set, respectively.

In another aspect, a system of generating partial sums from at least four multiple-digit sequences includes a first circuitry and a second circuitry. The first circuitry is configured to partition the multiple-digit sequences into at least a first set of multiple-digit sequences and a second set of multiple-digit sequences. The second circuitry is configured to generate at least a first partial sum and a second partial sum by adding respective segments of the multiple-digit sequences in the first set and second set, respectively, with two or more sets of segments of the multiple-digit sequences being added in parallel.

In another aspect, a computer readable medium for storing a computer program for generating partial sums from at least four multiple-digit sequences is described. The computer program includes instructions for causing a computer system to partition the multiple-digit sequences into at least a first set of multiple-digit sequences and a second set of multiple-digit sequences and generate at least one auxiliary set of multiple-digit sequences that include digits copied from respective digit positions in the first and second sets. The computer program also includes instructions for causing a computer system to replace the copied digits in the first and second sets by zeros to obtain a first altered set and a second altered set, respectively, of multiple-digit sequences each comprising multiple segments separated by the replaced zeros. The computer program also includes instructions for causing a computer system to generate at least a first partial sum by adding the multiple-digit sequences in at least one auxiliary set and generate at least a second and third partial sums by adding the multiple-digit sequences in the first altered set and the second altered set, respectively.

In another aspect, a computer readable medium for storing a computer program for generating partial sums from at least four multiple-digit sequences is described. The computer program includes instructions for causing a computer system to partition the multiple-digit sequences into at least a first set of multiple-digit sequences and a second set of multiple-digit sequences and generate at least first and second partial sums by adding respective segments of the multiple-digit sequences in the first and second sets, respectively, with two or more sets of segments of multiple-digit sequences being added in parallel. The computer program also includes instructions for causing a computer system to generate at least one auxiliary set of multiple-digit sequences that include digits derived from respective carry results from additions of respective segments of the multiple-digit sequences in the first and second sets.

Implementations may include one or more of the following. Generating the at least one auxiliary set may include copying digits from a first group of digit positions of each multiple-digit sequence in the first set and a second group of digit positions of each multiple-digit sequence in the second set to corresponding digit positions in a first auxiliary set where each of the digit positions in the first group is different from the digit positions in the second group. Generating the auxiliary set may further include setting a third group of digit positions in the first auxiliary set to zero, the third group corresponding to digit positions not included in either of the first and second groups. Generating the auxiliary sets may include copying digits from a first group of digit positions in the first set to corresponding digit positions in a first auxiliary set, and copying digits from a second group of digit positions in the second set to corresponding digit positions in a second auxiliary set. Adding the multiple-digit sequences in each of the first and second altered sets and the auxiliary set may include adding different segments of the multiple-digit sequences in parallel. The first set may have substantially the same number of multiple-digit sequences as the second set. The method may further include summing the partial sums. The multiple-digit sequences may be binary numbers. One or more zeros may be appended at the beginning or end of one or more of the multiple-digit sequences in the first and second sets. The digit positions in the first group may be periodic with a first period, the digit positions in the second group may be periodic with a second period and in some cases, the first period may be equal to the second period. Generating the first auxiliary set may further include setting a third group of digit positions in the first auxiliary set to zero, the third group corresponding to the digit positions not included in either of the first and second groups. In some cases, the digit positions in the third group are periodic with a third period. The third period equal to at least one of the first period and the second period. Each of the first and second groups of digit positions may include at least two digit positions that are consecutive. The third group of digit positions may also include at least two digit positions that are consecutive. Each of the sets of multiple-digit sequences may include at least two multiple-digit sequences and in some cases three or more multiple-digit sequences. The multiple-digit sequences may be obtained via a multiplication of two numbers or two matrices. The multiplication may be a floating point multiplication or a fixed point multiplication. the multiple-digit sequences may be obtained via a computation of an inner product or an outer product of two vectors. The digits derived from the respective carry results from additions of the respective segments in the first and second sets occupy bit positions in the auxiliary set corresponding to bit positions of the respective carry results. The bit positions of the respective carry results from additions of the respective segments in the first set may be different from the bit positions of the respective carry results from additions of the respective segments in the second set. The method may further include adding the auxiliary set and the first and second partial sums. At least one of the first circuitry and the second circuitry may comprise a processor. The second circuitry may further comprise an adder. A storage may store the first, second and third partial sums. The storage may be further configured to store the multiple-digit sequences. The first circuitry may be further configured to copy digits from a first group of digit positions of each multiple-digit sequence in the first set and a second group of digit positions of each multiple-digit sequence in the second set to corresponding digit positions in a first auxiliary set. Each of the digit positions in the first group is different from the digit positions in the second group. The first circuitry may be further configured to copy digits from a first group of digit positions of each multiple-digit sequence in the first set and a second group of digit positions of each multiple-digit sequence in the second set to corresponding digit positions in a first auxiliary set and a second auxiliary set, respectively. The second circuitry may be further configured to add the partial sums. Digits derived from the respective carry results from additions of the respective segments in the first and second sets may occupy bit positions in the auxiliary set corresponding to the bit positions of the respective carry results. The bit positions of the respective carry results from additions of the respective segments in the first set may be different from the bit positions of the respective carry results from additions of the respective segments in the second set. The second circuitry may be further configured to add the auxiliary set and the first and second partial sums.

Among the many advantages of the invention (some of which may be achieved only in some of its various aspects and implementations) are the following.

The need to propagate the carry between segments of a sum performed in parallel can be avoided. Patterns of gaps of zeros are created between segments in each of the summands by moving certain bits into auxiliary sets of summands (called "auxiliary arrays"). In some implementations, these bits can be moved into the auxiliary array directly as soon as the bits become available. In some implementations, the pattern of the moved bits is such that the auxiliary array is filled without overlaps and in some cases, with gaps of zeros. The gaps of zeros convert a sum of numbers with an arbitrarily large number of bits to independent parallel additions of pairs of shorter segments. Any carry bits resulting from the addition of pairs of segments, are trapped in the gaps. This allows for fast parallel addition that is independent of the number of bits of the summands, and instead depend only on the number of bits in the segments added in parallel. For example, the time needed to propagate the carry from one segment to the next can be avoided. For example, the time needed to propagate the carry from one segment to the next can be avoided. In other words, the adders described herein are based on restructuring the summands such that gaps of zeros are created. These gaps arrest the propagation of the carries that result from adding the segments between the gaps. The restructuring does not require any knowledge of the bits to be moved or any checks or evaluations of the given summands. The pattern of the moved bits may be decided in advance as part of the algorithm and built into the structure of the adder. As soon as a summand is available, the restructuring can be done essentially instantaneously with the need to necessarily perform checks, valuations or tests. Therefore, no additional time is needed. The addition of the short segments can be computed in parallel.

Compared to the carry-select adder, an area savings of approximately 25% and time savings of approximately 50% can be achieved in some implementations.

In the carry-save adder the carry bits are accumulated separately, allowing fast parallel addition, while adding the sum of the carries at the end. Adders described in this application are able to avoid carry propagation beyond a few bits (for example, within the short segments). In some implementations, the time needed to add N numbers of b bits each satisfies:

$$T_N(b) = a \log_2 N + f(b)$$

where the dependence on the number of bits is additive and is affected only by a small number of residual additions at the end. For large N even this dependence can be ignored and the time to add N numbers of b bits is proportional to the logarithm of N. Since the number of residual additions at the end is small, a very fast parallel adder can be used to compute those additions.

DETAILED DESCRIPTION

There are a great many possible implementations of the invention, too many to describe herein. Some possible implementations that are presently preferred are described below. It cannot be emphasized too strongly, however, that these are descriptions of implementations of the invention, and not descriptions of the invention, which is not limited to the detailed implementations described in this section but is described in broader terms in the claims.

Figure 1:
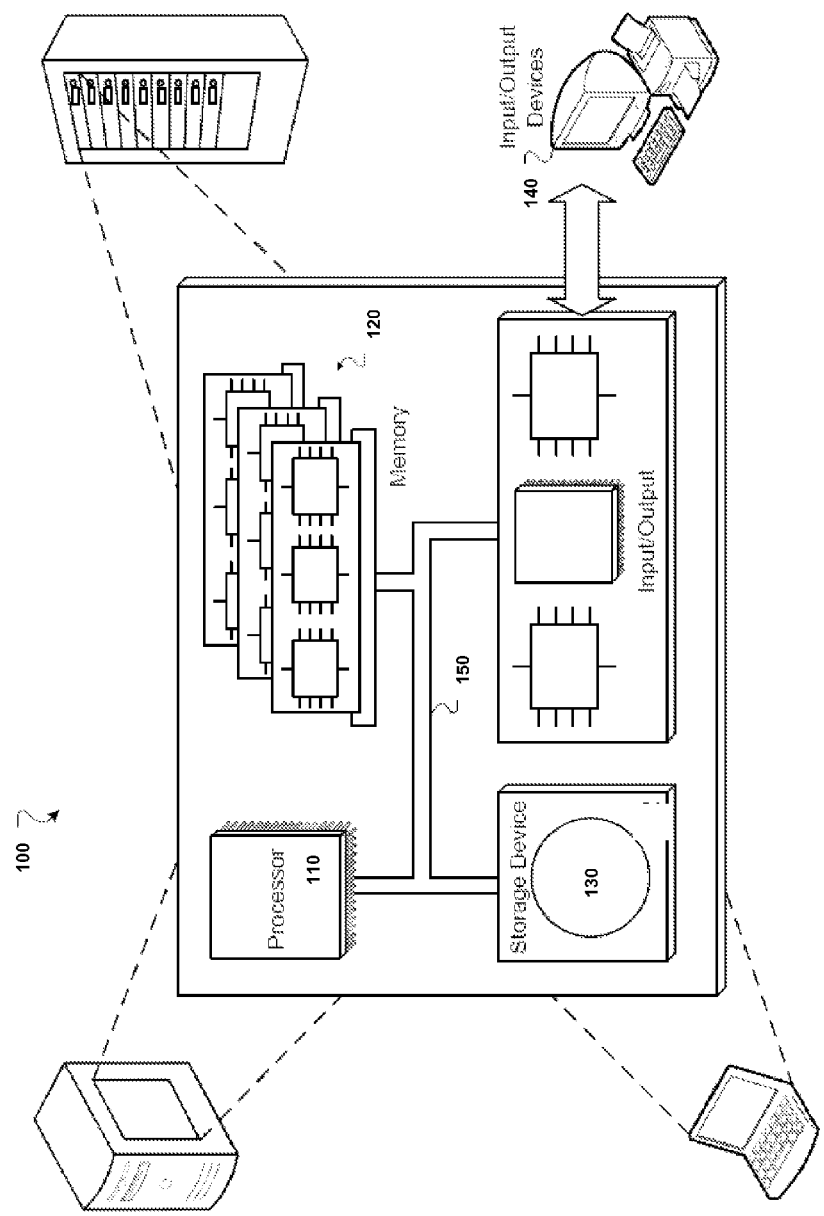
FIG. 1 is a diagram depicting a computing system.

FIG. 1 is a schematic diagram of a computer system 100. The system 100 can be used for the operations described in association with any of the computer-implemented methods described herein, according to one implementation. The system 100 includes a processor 110, a memory 120, a storage device 130, and an input/output device 140. Each of the components 110, 120, 130, and 140 are interconnected using a system bus 150. The processor 110 is capable of processing instructions for execution within the system 100. In one implementation, the processor 110 is a single-threaded processor. In another implementation, the processor 110 is a multi-threaded processor. The processor 110 is capable of processing instructions stored in the memory 120 or on the storage device 130 to display graphical information for a user interface on the input/output device 140.

The memory 120 stores information within the system 100. In some implementations, the memory 120 is a computer-readable medium. The memory 120 can include volatile memory and/or non-volatile memory.

The storage device 130 is capable of providing mass storage for the system 100. In one implementation, the storage device 130 is a computer-readable medium. In various different implementations, the storage device 130 may be a floppy disk device, a hard disk device, an optical disk device, or a tape device.

The input/output device 140 provides input/output operations for the system 100. In some implementations, the input/output device 140 includes a keyboard and/or pointing device. In some implementations, the input/output device 140 includes a display unit for displaying graphical user interfaces.

The features described can be implemented in digital electronic circuitry, or in computer hardware, firmware, or in combinations of them. The features can be implemented in a computer program product tangibly embodied in an information carrier, e.g., in a machine-readable storage device, for execution by a programmable processor; and features can be performed by a programmable processor executing a program of instructions to perform functions of the described implementations by operating on input data and generating output. The described features can be implemented in one or more computer programs that are executable on a programmable system including at least one programmable processor coupled to receive data and instructions from, and to transmit data and instructions to, a data storage system, at least one input device, and at least one output device. A computer program includes a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Computers include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

The processor 110 carries out instructions related to a computer program. The processor 110 may include hardware such as logic gates, adders, multipliers and counters. The processor 110 may further include a separate arithmetic logic unit (ALU) that performs arithmetic and logical operations. The adders may include any number and type of half adders, full adders and multiple bit adders. The adder circuits may be arranged to realize more complex adders such as ripple carry adders, carry look-ahead adders, carry skip adders, conditional sum adders, carry complete adders or adders such as described in this application.

In general, hardware in a processor 110 is configured to add numbers of a given maximum length. This maximum length may be expressed in digits, such as binary digits called bits, for example, 4 bit adder, 16 bit adder, 32 bit adder etc. These adders may be used to add numbers that are greater than the maximum length of the adder. For example, a processor that has only 16 bit adders may need to add two or more 128 bit numbers. In such cases, the long additions are partitioned into several shorter additions involving smaller groups of bits, called segments, and the final answer is obtained by the summing the intermediate segments. A number of sums of the segments may be computed in parallel or sequentially in accordance with the hardware capabilities of the processor.

Figure 2:
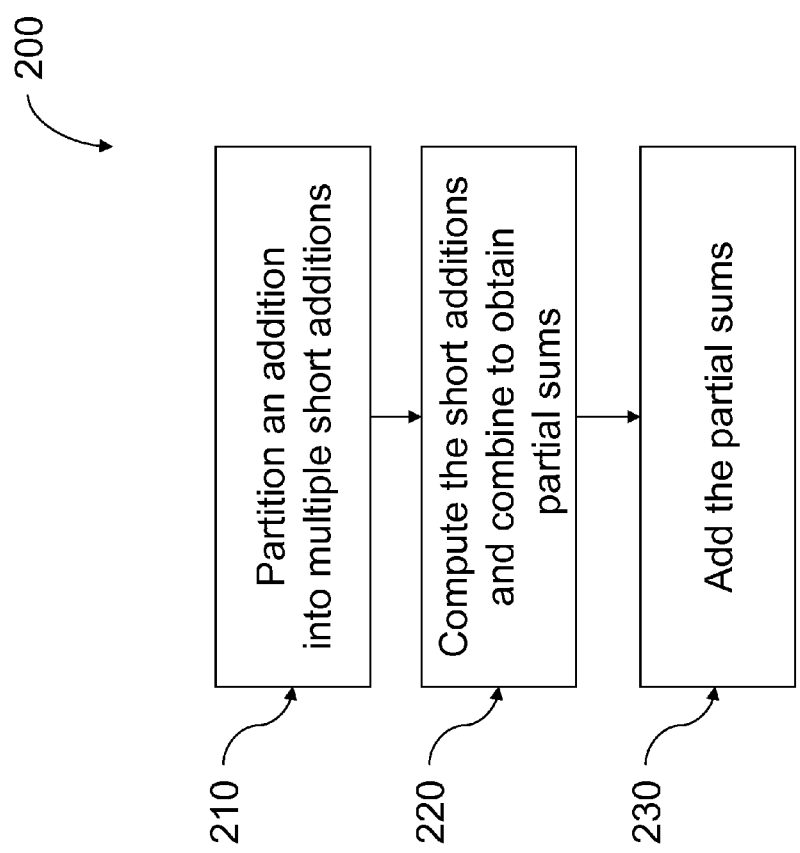
FIG. 2 is a flow diagram depicting operations for adding numbers.

Referring now to FIG. 2, a flowchart depicts example operations followed in adding longer numbers than allowed by the hardware. Operations include partitioning 210 the long addition into multiple short additions. The partitioning is done in accordance with the available hardware. For example, if two 32 bit numbers are to be added using 4 bit adders, the long addition is partitioned into 8 separate 4 bit additions. In another example, the 32 bit addition may be partitioned into 4 separate 4 bit additions and 2 separate 8 bit additions if the available hardware allows the computation of such additions. Operations further include computing 220 the short additions of the segments separately. The shorter additions may be computed in parallel, in sequence or as a combination of parallel and in sequence depending on the hardware available to compute the shorter additions. The results of the short additions are combined appropriately to obtain partial sums. Operations also include adding 230 the partial sums together. In some cases, the operations 210 and 220 may be repeated one or more times to add the results of the shorter additions together.

Figure 3A:
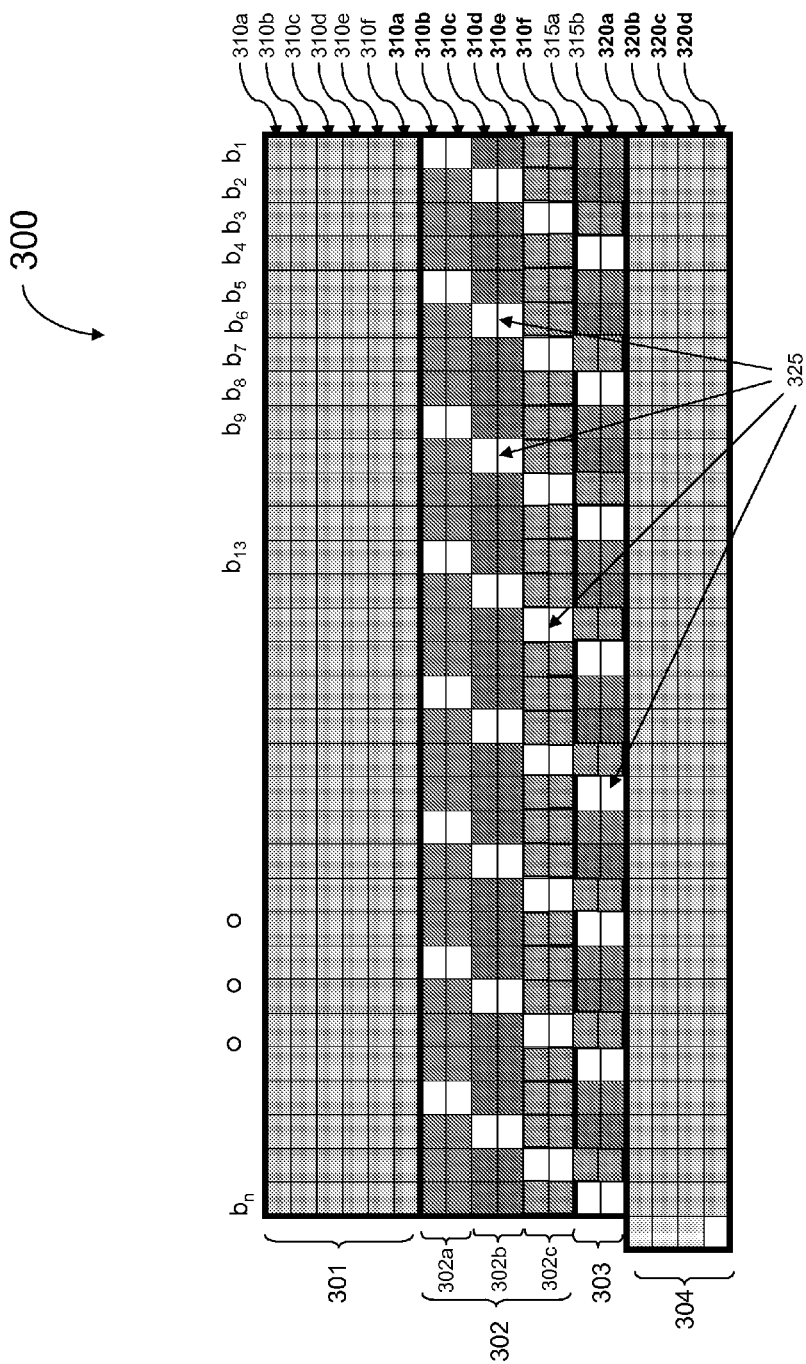
FIGS. 3A-3C, 4A, 4B, 5 and 6 are diagrams depicting schemes for performing multi-operand additions.

Referring now to FIG. 3A, a schematic diagram describes adding multiple numbers called summands. In this example, each summand is a long sequences of digits. In the following part of the document, we refer to the digits as binary digits or bits.

However, the digits may be of any base such as decimal, octal, hexadecimal etc. The summands to be added together are represented as the set 301. In this example, the set 301 includes 6 numbers each of which is 32 bits in length. The numbers are denoted as 310a-310f. The least significant bit of each number is denoted as $b_1$ while the most significant bit is denoted as $b_n$. In this example, since the numbers are 32 bit long, n=32.

In this example, the 6 numbers to be added together are divided into 3 different pairs 302a, 302b and 302c (302 in general). The pair 302a includes the numbers 310a and 310b, the pair 302b includes the numbers 310c and 310d and so on. In this example, the ordering is chosen only for illustrative purposes. In general, any two numbers from the set 301 may be chosen to form a pair 302. In this example, it is assumed that the available hardware allows for adding two 3 bit numbers at a time to produce up to a 4 bit result. The extra bit in the result allows for the carry that may need to be added to the least significant bit of the next most significant bits. For example, consider the addition of the numbers 310a and 310b in the set 301. If the segments including bits $b_2$, $b_3$ and $b_4$ were added using a 3 bit adder, the sum may include a carry that would have to be added to the least significant bit of the sum of the segments including bits $b_5$, $b_6$ and $b_7$. The next sum of segments would produce another carry that would have to be added to the least significant bit of the following sum of segments. In this way, the carry of each segment would have to be propagated to the next all the way up to the most significant bit $b_n$ of the numbers being added.

To avoid the need to propagate the carry from one segment to another, all the way to the most significant bits, in some implementations, certain bit positions in each of the numbers being added are replaced by zeros and the replaced bits are moved to a corresponding bit position in an auxiliary array 303. In this example, bits corresponding to bit positions $b_1$, $b_5$, $b_9$ etc, from the pair 302a, are replaced by gaps 325 of zeros and the replaced bits are moved to corresponding bit positions in a pair of numbers represented by the auxiliary array 303. Similarly, bits corresponding to bit positions $b_6$, $b_{10}$, $b_{13}$ etc, from the pair 302b, are replaced by gaps 325 of zeros and the replaced bits are moved to corresponding bit positions in the auxiliary array 303. Bits from the pair 302c are also moved to the auxiliary array in a similar fashion. The pattern of the bits in the different pairs is staggered, such that the auxiliary arrays are filled without overlaps. In other words, the bit positions moved from the pair 302a are different from the bit positions moved from each of the pairs 302b and 302c. When the pairs 302 are altered in the above fashion, the sum for each segment can be calculated without propagating the carry to the next segment. For example, when the bits $b_2$, $b_3$ and $b_4$ are added using a 3 bit adder, the carry that might result is at bit position $b_5$. Since the numbers 310a and 310b have been altered to have zeros at that location, the bit position $b_5$ of the resulting partial sum will be zero if there is no carry from the addition of bits in bit position $b_4$ and will be one if there is a carry from the addition of bits in bit position $b_4$. In either case, the carry is not propagated to bit position $b_6$. The bits that were replaced at these bit locations corresponding to bit position $b_5$ are not ignored in the final sum since they are added together in the auxiliary array. For example, bits corresponding to $b_5$ from the pair 302a, $b_6$ from the pair 302b and $b_7$ from the pair 302c are added together at the corresponding locations in the auxiliary array. Since the result of summing the numbers in the auxiliary array are later added to the results of summing the numbers in the pairs 302a-302c, manipulating the bit positions, as described in the above example, does not affect the final sum. In some implementations, the auxiliary array may also have one or more gaps 325 of zeros to arrest one or more carries resulting from sums of different segments. In this example, gaps 325 are introduced at $b_4$, $b_8$, $b_{12}$ etc. in the auxiliary array, to arrest the carry resulting from summing the bits at $b_1$-$b_3$, $b_5$-$b_7$ and $b_9$-$b_{11}$, respectively. Adders using these techniques may therefore be referred to as carry-arrest adders.

The result of summing the pair of numbers 302a is denoted as a partial sum 320a. Similarly, the result corresponding to summing the pairs 302b, 302c and the auxiliary array pair 303 are denoted as partial sums 320b, 320c and 320d, respectively. In some implementations, the results 320a-320d are one bit longer in order to accommodate a carry from the addition of the most significant bits. For example, when the bit positions $b_n$, $b_{n-1}$ and $b_{n-2}$ in the pairs 302a are added, the result may have a carry that needs to be accommodated. In some implementations, when the bit positions corresponding to the most significant bit in the pair has gaps 325 of zeros (e.g., as in the auxiliary array pair 303 in the above example), the result will not have an extra carry.

The numbers or bit sequences 320a-320d are partial sums resulting from adding the numbers 310a-310f that can be added together to obtain the final sum. The operations described in the above example reduce the number of long sequences to be added from 6 to 4 by performing the short additions as described above. In some implementations, two or more of the additions of the segments of a given pair of bit sequences may be done in parallel thereby reducing the time required for the additions.

The above example shows that the gaps 325 are introduced in each pair of summands 302a-302c and 303 with a periodicity of 4. It should be noted that in some implementations the gaps 325 may also be aperiodic. In the above example, the gaps may be distributed in any way as long as the corresponding bit positions in one pair do not overlap with bit positions of gaps introduced in any of the other pairs. For example, in some implementations, the periodicity of gaps in one pair of summands 302a may be different from the periodicity of a different pair of summands 302b or auxiliary array 303. The gaps may be periodic in one pair of summands 302b while aperiodic in one or more different pairs of summands 302c or auxiliary array 303.

In some implementations, the above scheme may be used to add at least 4 long sequences of bits. If four n bit sequences 301 are used in the above scheme, the number of n+1 (or n) bit sequences or partial sums obtained will be 3. In general, the above scheme can be used repetitively until 3 partial sums are obtained. The last 3 partial sums may then be added together using any fast adder.

The above scheme may also be illustrated as follows. Consider adding together N summands of b bits each. In some implementations, the set of N summands is divided into N/(2r) sets of 2r summands each and each set is grouped into pairs denoted by $(x_i, y_i)$, where $i=0, 1, \ldots r-1$.

For every pair $(x_i, y_i)$ a set of bit positions is replaced by gaps 325 of zeros. In some implementations, every (r+1)th bit in each pair may be replaced by the gaps 325 of zeros. The resultant altered pair 302 of numbers may be denoted by $(x_i', y_i')$, where $i=0, 1, \ldots, r-1$. The bits replaced by gaps 325 of zeros are placed in corresponding bit positions in an auxiliary array, which in this example corresponds to the auxiliary array pair 303 of numbers $(x_r, y_r)$. In some implementations, the bit positions replaced in one pair do not overlap with bit positions replaced in any other pair. For example, the starting points of the gaps 325 for each pair may be shifted by one more bit for every pair such that the replaced bits are interlaced in the auxiliary array pair 303 without overlapping and placed one next to the other. The gaps 325 may also be introduced in the auxiliary array pair 303. In the example shown in FIG. 3A, the periodicity of the gaps 325 in the auxiliary array pair is same as the periodicity of the gaps 325 in each of the pairs 302a, 302b and 302c. In such a case, every (r+1)th bit in the auxiliary array pair 303 is left unoccupied by the transfer. By leaving selected bit positions unoccupied, it is implied that gaps 325 of zeros exist at those bit positions. The resulting altered pairs 302 along with the auxiliary array pair 303 may be represented in matrix form as:

$$\begin{bmatrix} x_0' \\ y_0' \\ x_1' \\ y_1' \\ x_2' \\ y_2' \\ x_3' \\ y_3' \end{bmatrix} =$$

$$\begin{bmatrix} \ldots & 0 & x_0(7) & x_0(6) & x_0(5) & 0 & x_0(3) & x_0(2) & x_0(1) & 0 \\ \ldots & 0 & y_0(7) & y_0(6) & y_0(5) & 0 & y_0(3) & y_0(2) & y_0(1) & 0 \\ \ldots & x_1(8) & x_1(7) & x_1(6) & 0 & x_1(4) & x_1(3) & x_1(2) & 0 & x_1(0) \\ \ldots & y_1(8) & y_1(7) & y_1(6) & 0 & y_1(4) & y_1(3) & y_1(2) & 0 & y_1(0) \\ \ldots & x_2(8) & x_2(7) & 0 & x_2(5) & x_2(4) & x_2(3) & 0 & x_2(1) & x_2(0) \\ \ldots & y_2(8) & y_2(7) & 0 & y_2(5) & y_2(4) & y_2(3) & 0 & y_2(1) & y_2(0) \\ \ldots & x_0(8) & 0 & x_2(6) & x_1(5) & x_0(4) & 0 & x_2(2) & x_1(1) & x_0(0) \\ \ldots & y_0(8) & 0 & y_2(6) & y_1(5) & y_0(4) & 0 & y_2(2) & y_1(1) & y_0(0) \end{bmatrix}$$

Only 9 of the least significant bits have been shown in the above equation, where $x_0(j)$ represents the jth bit position of the number $x_0$. In some implementations, the above matrix will have only one pair of gaps 325 of zeros in each column. The r+1 bit segments of the pairs 302 and the auxiliary array pair 303 may be added using any parallel adders. For example, each pair 302 could be added by a parallel adder that adds each segment of r bit numbers (each having a zero in the gap corresponding to the (r+1)th bit position, yielding an r+1 bit sum), with the carry (if any) arrested in the gap created between each two adjacent segments. In this example, the total time to add two b bit numbers is substantially same as the time $\tau_r$ of adding two r bit numbers. In some implementations, this may be solely dependent on the method used to add the two r bit numbers. The auxiliary array pair 303 of numbers may also be added r bits at a time. In such a case, the 2r numbers in a given set are replaced by r+1 numbers of b+1 bits each. In other words, in this example, the original $N=N_0$ summands of b bits each are replaced by $N_1$ summands of b+1 bits each in $\tau_r$ time, where:

$$N_1 = N_0 \cdot \frac{r+1}{2r}$$

In some implementations, the above steps are repeated for the $N_1$ summands. For each step $N_i$ that the process is repeated, the number of summands in the next step becomes:

$$N_{i+1} = N_i \cdot \frac{r+1}{2r}$$

Proceeding for l steps in the above example, the number of summands becomes:

$$N_l = N_0 \cdot \left(\frac{r+1}{2r}\right)^l$$

each of which are of length b+1 bits. In some implementations, the repetitions are stopped when the condition $$N_l = N_0 \cdot \left(\frac{r+1}{2r}\right)^l = r+1$$

is fulfilled. In such cases, the remaining summands representing partial sums from the previous step are added using any available algorithm and/or adder. The number of times that the above described steps may be repeated in the above example is given by:

$$l = \left(1 + \frac{\log\frac{N}{r} - 1}{\log\frac{2r}{r+1}}\right)$$

Assuming that the remaining r+1 numbers in the above case are added together using for example, an adder tree, the total time $\tau_N$ needed to add the N numbers is given by:

$$\tau_N = l\tau_r + \tau_{b+l}\log(r+1) = \left(1 + \frac{\log\frac{N}{r} - 1}{\log\frac{2r}{r+1}}\right)\tau_r + \tau_{b+l}\log(r+1)$$

where $\tau_{b+1}$ is the time needed to add numbers of b+1 bits each. In some implementations, the time is increased by a small amount to accommodate the extra bit per level in the final adder tree, to an average of:

$$b + l + \frac{\log(r+1)}{2}$$

Example 1

The scheme of addition described above with respect to FIG. 3A is further illustrated by way of an example. The following example is shown using decimal digits. The concepts described can be extended to any other base.
Consider adding the following numbers:
1234+5678+9123+4567+8912+3456. The result of the addition is 32970. The scheme of adding numbers described above can be used to perform this addition as follows:

```
    1230                          Pair 1
    5670
    ----
    6900  (partial sum 1)

9103                          Pair 2
    4507
    -----
   13610  (partial sum 2)

8012                          Pair 3
    3056
    -----
   11068  (partial sum 3)

0924                    Auxiliary pair
    0468
    ----
    1392  (partial sum 4)
```

The partial sum in the above examples can be added together as:
6900+13610+11068+1392=32970, which is the expected result. As mentioned above, in some implementations, another round of addition using another auxiliary pair may be used to add the partial sums together.

Example 2

Consider the addition of the following decimal numbers:
5643783922754917
7856435298711178
5487352454676978
7586634398723266
3647897767775535
4769867243523221

In this example, r=3 is used along with periodic gaps in the pairs. Therefore every fourth bit, with staggered beginnings in the six decimal numbers, is moved to the auxiliary pair. The six decimal numbers are therefore partitioned into three pairs of additions with an extra addition due to an auxiliary pair. The four pair of numbers can be added using parallel addition of three bit numbers, without the need for any carry propagation. The resultant partial sums may again be grouped into sets of six numbers and the process repeated until two numbers are left. The addition of the last two partial sums may then be computed using non-redundant binary parallel adders. The process is partially depicted using the following notations:

$$\sum \begin{pmatrix} 5643783922754917 \\ 7856435298711178 \\ 5487352454676978 \\ 7586634398723266 \\ 3647897767775535 \\ 4769867243523221 \end{pmatrix} = \sum \begin{pmatrix} \boxed{\begin{array}{c} 5640783022704910 \\ 7850435098701170 \end{array}} \\ \boxed{\begin{array}{c} 5407350454076908 \\ 7506630398023206 \end{array}} \\ \boxed{\begin{array}{c} 3047807760775035 \\ 4069807240523021 \end{array}} \\ \boxed{\begin{array}{c} 0683092907650577 \\ 0786064203710268 \end{array}} \end{pmatrix}$$

$$= \sum \begin{bmatrix} 13491218121406080 \\ 12913980852100114 \\ 7117615001298056 \\ 1469157111360845 \end{bmatrix}$$

Figure 3B:
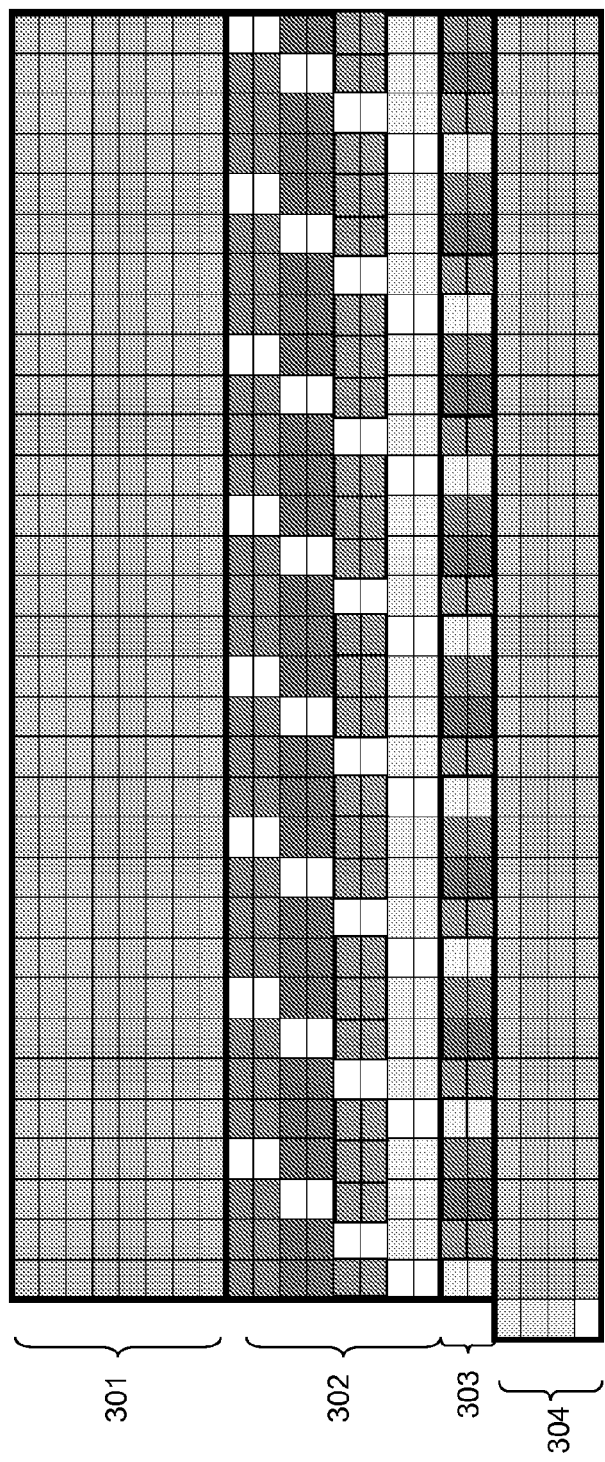

In some implementations, the auxiliary array may not have gaps of zeros. Referring now to FIG. 3B, such a scheme for adding multiple long sequences of bits is shown. The auxiliary array pair 303 in such cases does not have the gaps of zeros. In some implementations, the numbers in the auxiliary array are then added using any available adder and/or algorithms. Adders such as the one shown in FIG. 3B are also referred to as a carry arrest adder with full auxiliary array. In some implementations, such adders are used for adding at least 6 numbers that are reduced to 4 after a first pass.

Figure 3C:
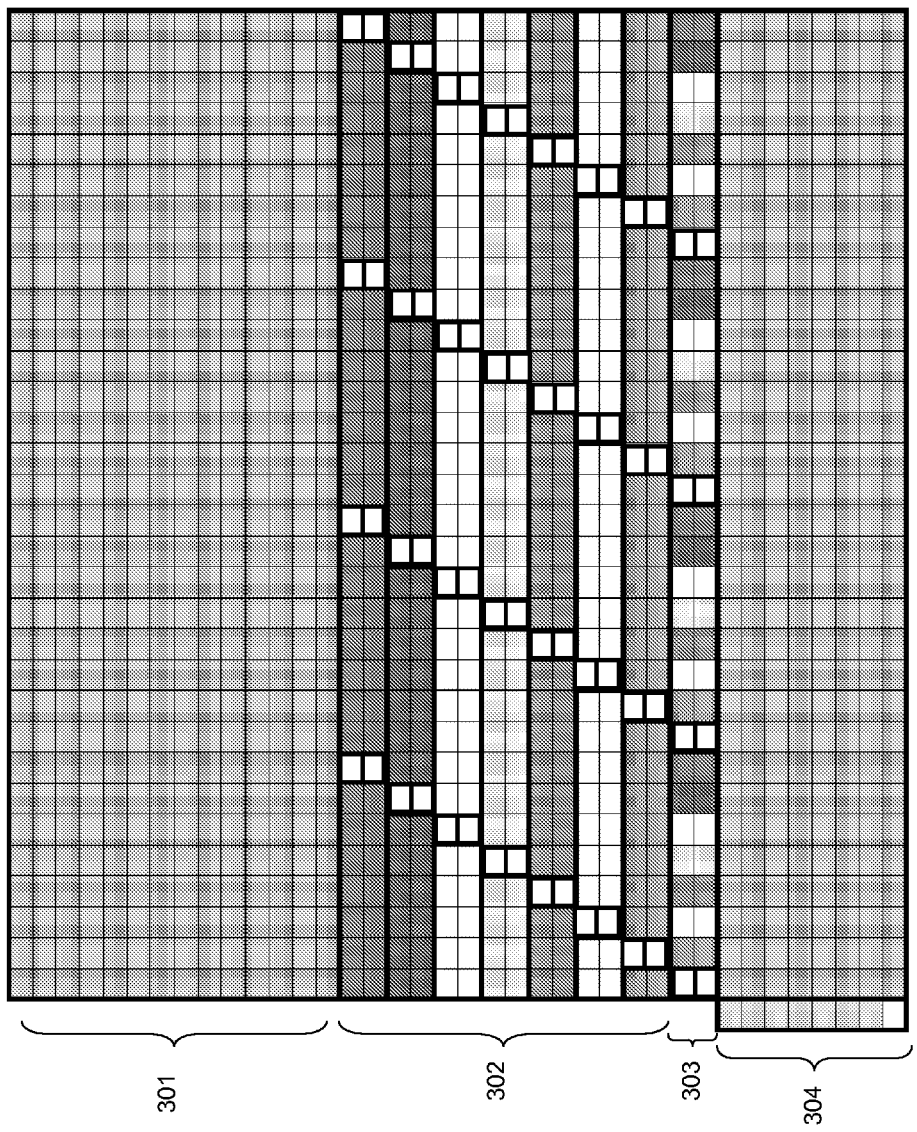

Referring now to FIG. 3C, another example of adding multiple long sequences of bits is shown. In this example, 14 summands, each 32 bit long, are added to each other using a substantially similar scheme described with respect to FIG. 3A. The number of summands is reduced to 8 from the original 14 after a first pass. In some implementations, the carry arrest adding method may be applied again until only a few partial sums, say 4, are left. These may then be added using any adder. In the example of FIG. 3C, the reduction from 14, 32-bit numbers to 8, 33-bit numbers requires approximately the time to add 2, 7-bit numbers. Moreover, this is independent of the original number of bits (32 in this case), and depends only on the size of the segments of bits separated with gaps (7 in this case). Therefore, the speed is essentially decided by the addition time of the short adders, 7 bits in this case, and not the length of the original summands (32 bits in this case).

In the above example, the number of 32 bit summands is N=14. Since 7 bits are added at a time, r=7. If the reduction from 14 to 8 is applied until 8 numbers remain, then l steps are needed, where:

$$N\left(\frac{8}{14}\right)^l = 8$$

which yields:

$$l = \frac{\log_2 N - 3}{\log_2(7/4)} \cong 1.2386 \log_2 N - 3.7157$$

For N=14, this gives l=1, which is what is expected since the reduction from 14 summands to 8 is achieved in a single pass or step. In general, in the above example, each of the l steps requires the time to add two 7 bit numbers only. The remaining number of summands, 8 in this case, can be further reduced using another carry arrest adder. However, if the remaining 8 summands are added via an adder tree, the total time needed is:

$$\tau_N = T(7)(1.2386 \log_2 N - 3.7157) + 3T(b + \log N - 3)$$

In comparison, the time required to add the N original summands using an adder tree is given by:

$$T_N(b) = \sum_{r=1}^{\log_2 N} T(b + r - 1) \cong (\log_2 N) T\left(b + \frac{1}{2} \log N\right)$$

The time savings by using a carry arrest adder may be represented as a function of N and b as:

$$\eta(N, b) \equiv 1 - \frac{\tau_N}{T_N(b)}$$

where η=0 would signify no savings and η=1 would signify that the carry arrest adder takes zero time to add the N, b bit summands. Using this in the above example, η(N,b) can be approximated as:

$$\eta(N, b) \cong 1 - \frac{1.2386 T(7)}{T\left(b + \frac{\log N}{2}\right)}$$

In some cases, it is possible to model different adder types by the equation:

$$T(b) = \zeta b^\alpha, \ 0 < \alpha \le 1$$

where α=1 indicates a class of parallel adders, while α<1 indicates an adder with increased area to achieve higher speed (such as the carry-select adder). Using this in the above example:

$$\eta(N, b) \cong 1 - \frac{1.2386(7)^\alpha}{\left(b + \frac{\log N}{2}\right)^\alpha} = 1 - 1.2386\left(\frac{7}{b + \frac{\log N}{2}}\right)^\alpha$$

which for relatively large values of N, may be approximated as:

$$\eta(N) \cong 1 - 1.2386\left(\frac{14}{\log N}\right)^\alpha$$

which in turn signifies that the savings due to using a carry arrest adder is independent of the number of bits b.

Figure 4A:
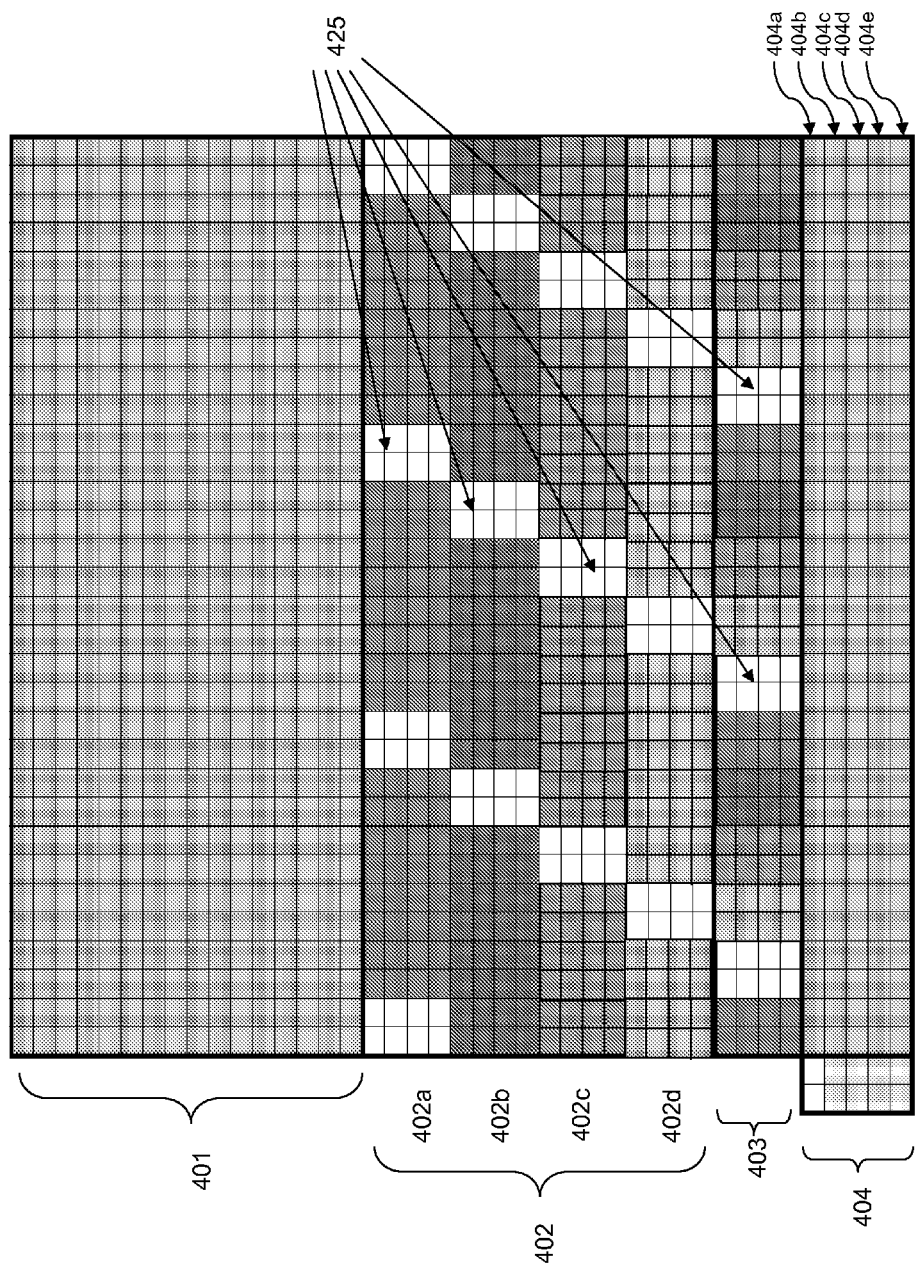

In some implementations, more than a pair of numbers may be added in a given partial sum. Referring now to FIG. 4A, an exemplary scheme for adding multiple long bit sequences shows generating altered sets 402a-402d (402 in general) from initial summands 401, and adding 4 summands in each of the altered sets 402 and the auxiliary set 403 to compute the partial sums 404a-404e (404 in general). In this example, since 4 numbers are added at a time, the gaps 425 of zeros introduced in the sets 402 are configured to accommodate 2 bit carries. In general, the number of bits in the carry depends on how many numbers are added together in each partial sum. The adders implemented as per the scheme shown in FIG. 4A may be referred to as block carry arrest adders. As described above with respect to FIGS. 3A-3C, the block gaps 425 may be distributed over non-overlapping bit positions in different sets such that the corresponding bits positions of the auxiliary set are filled without overlaps. In some implementations, the bit positions corresponding to the block gaps 425 from one set (for example 402a) are different from the bit positions corresponding to the block gaps from another set (for example 402b). The block carry arrest adder is a generalization of the carry-arrest adder discussed above. In some implementations, the block carry arrest adder allows more than two numbers to be added and uses wider gaps 425.

Figure 4B:
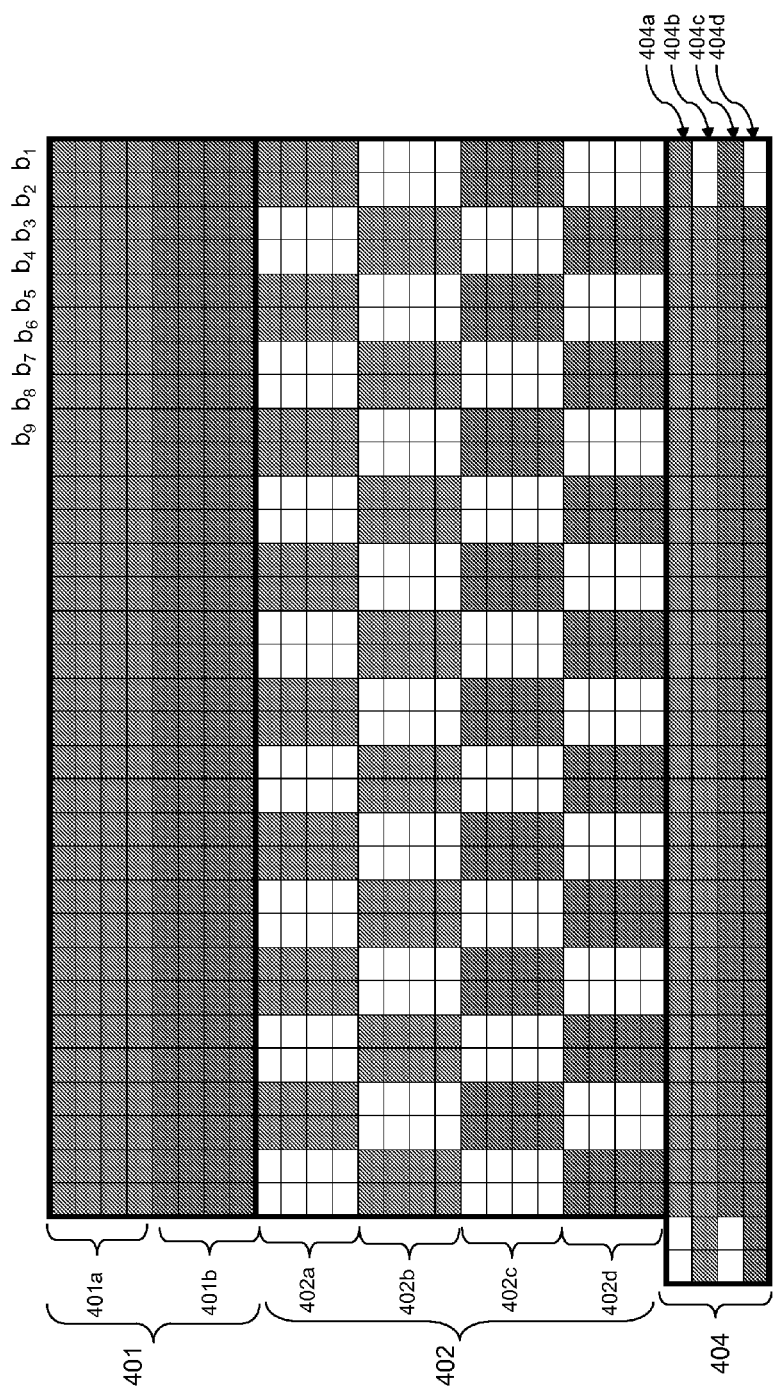

Referring now to FIG. 4B, another example of a block carry arrest adder is shown. In this example, the summands 401 are divided into two sets 401a and 401b. A first altered set 402a is formed from the set 401a by replacing some bit positions in the summands of 401a by gaps of zeros. For example, the bits at bit positions $b_3$ and $b_4$, among others, in set 402a are replaced by zeros. This is done to accommodate the possible 2 bit carry that may result from adding the four 2 bit numbers at bit positions $b_1$ and $b_2$ of set 402a. The replaced bits are moved to a first auxiliary set 402b. Zeros are filled in at the bit positions in 402b that correspond to the bit positions in 402a not replaced by zeros. Continuing with the above example, the bit positions $b_1$ and $b_2$ in the set 402b will be filled by zeros. This can be viewed as partitioning a set of N summands of b bits each into two sets of N summands of b bits each (an altered set and an auxiliary set) with zeros introduced in the summands. The bit positions where the zeros are introduced in the first altered set 402a are different from the bit positions where the zeros are introduced in the first auxiliary set 402b. As described above, the gaps of zeros are able to arrest the carries of several shorter additions that result from such partitioning of the summands. In the above example, the zeros are introduced in set 402a such that the possible carry of one or two bits from the sum of the four 2 bit summands in bit positions $b_1$ and $b_2$ are arrested in the gaps of zeros created at bit positions $b_3$ and $b_4$. The result of the sum is then stored at bit positions $b_4$, $b_3$, $b_2$ and $b_1$ of the partial sum 404a.

The summands in the set 401b are also divided into two sets, a second altered set 402c and a second auxiliary set 402d, following essentially the same methodology as described with respect to set 401a. In the example shown in FIG. 4B, the bit positions where zeros are introduced in set 402c are the same as the bit positions where zeros are introduced in set 402a. Correspondingly, the bit positions of zeros in set 402d match those of set 402b. In this example, since there are two separate auxiliary sets, one for each altered set, there is no requirement that the bits positions of the auxiliary sets are filled without overlaps. In some implementations, the bit positions where zeros are introduced in sets 402c and 402d may be chosen independently of the distribution of zeros in the sets 402a and 402b.

As seen from the example in FIG. 4B, the shorter addition of four 2 bit segments can be carried out in parallel. The bits resulting from the short additions in set 402a are stored in the partial sum 404a. The bits resulting from the short additions in sets 402b, 402c and 402d are stored in the partial sums 404b, 404c and 404d, respectively. The partial sums 404a-404d may then be added together using a carry arrest adder or any other multi-operand adder.

Even though the above example is shown for four sets 402 each having multiple segments of four 2 bit numbers, this example should not be considered as limiting in any sense. The summands 401 may be partitioned into sets 402 of any number of summands. The sets 402 may be further partitioned into shorter additions of any number of bits.

The example shown in FIG. 4B may be represented using equations as follows. Consider the addition of N positive integers of b bits each. These numbers are partitioned into s sets, each containing $2^r$ numbers of r bits each such that:

$$s = N \frac{b}{r 2^r}$$

In the above example, N=8 summands are partitioned into s sets each containing numbers of 4 bits each. Therefore, in this case, r=2 and $$s = 8 \cdot \frac{32}{2 \times 4} = 32$$

Indeed, the number of 2 bit short additions involving 4 numbers each that need to be performed in the above example is 32. The numbers in each set are added. When $2^r$ numbers of r bits each are added, we get one number of 2r bits. Each (N/$2^r$) numbers of b bits could be reduced into just two numbers of b+r bits each after adding each $2^r$ numbers of r bits, and merging the resulting 2r bit numbers into the partial sums 404a-404d. This results in a total of $N_1$ numbers of b+r bits each, where $$N_1 = 2 \cdot \frac{N_0}{2^r} = \frac{N_0}{2^r} = \frac{N_0}{2^{r-1}}, N_0 = N$$

This is achieved in the time needed to add $2^r$ numbers of r bits each. The above steps are then repeated l times until two numbers of b+rl bits each remain, where $$N_l = \frac{N}{2^{l(r-1)}} = 2$$

Therefore, in this example $$l = \frac{\log N - 1}{r - 1}$$

Also, the total time to add all N numbers of b bits is therefore given by:

$$T_N(b) = l\tau_r + T_2(b+rl)$$

where $\tau_r$ is the time needed to add $2^r$ numbers of r bits each and $T_2(b+rl)$ is the time needed to add the last two numbers of b+rl bits each. In some implementations, for each N, there is an optimal value for r, which depends on N, b, the type of adder used to add $2^r$ numbers of r bits each and the adder used to add the last two numbers.

In some implementations, each number is divided into r bit numbers and grouped, in general, into sets of L numbers. Each set, when added together, results in a number of r+log L bits. Each L numbers of the given N are therefore merged after these additions into numbers of r+log L bits each and results in $N_1$ numbers, where $$N_1 = \frac{N_0}{L}\left(1 + \frac{\log L}{r}\right), N_0 = N$$

The above additions are computed in the time needed to add L numbers of r bits each. This time is defined as $T_L(r)$ which may depend on the form of adder used. In some implementations, the process may be repeated l times until only two numbers have to be added. Therefore:

$$N_l = N\left(\frac{\left(1 + \frac{\log L}{L}\right)}{L}\right)^l = 2$$

The number of steps l is therefore given by:

$$l = \frac{\log N - 1}{\log L - \log\left(1 + \frac{\log L}{r}\right)}$$

The total time of computation is given by:

$$\tau_N = l\tau_L(r) + T_2(b + \log N - 1)$$

Where $T_2(b)$ is the time needed to add two numbers of b bits each, and in some implementations depends on the type of adder used.

In some implementations, the block carry arrest adder has the advantage of processing blocks independently. In some implementations, the adders described herein may be used for parallel and multi-core processing. In some implementations, each block of r bit numbers could be computed using any multi-operand adder, including the block-carry-arrest adder again, or any regular non-redundant adder. In some implementations, the carry arrest adders and the block carry arrest adders may be used in combination. In such implementations, a switch between a carry arrest adder and a block carry arrest adder may be made at any stage of computation.

Figure 5:
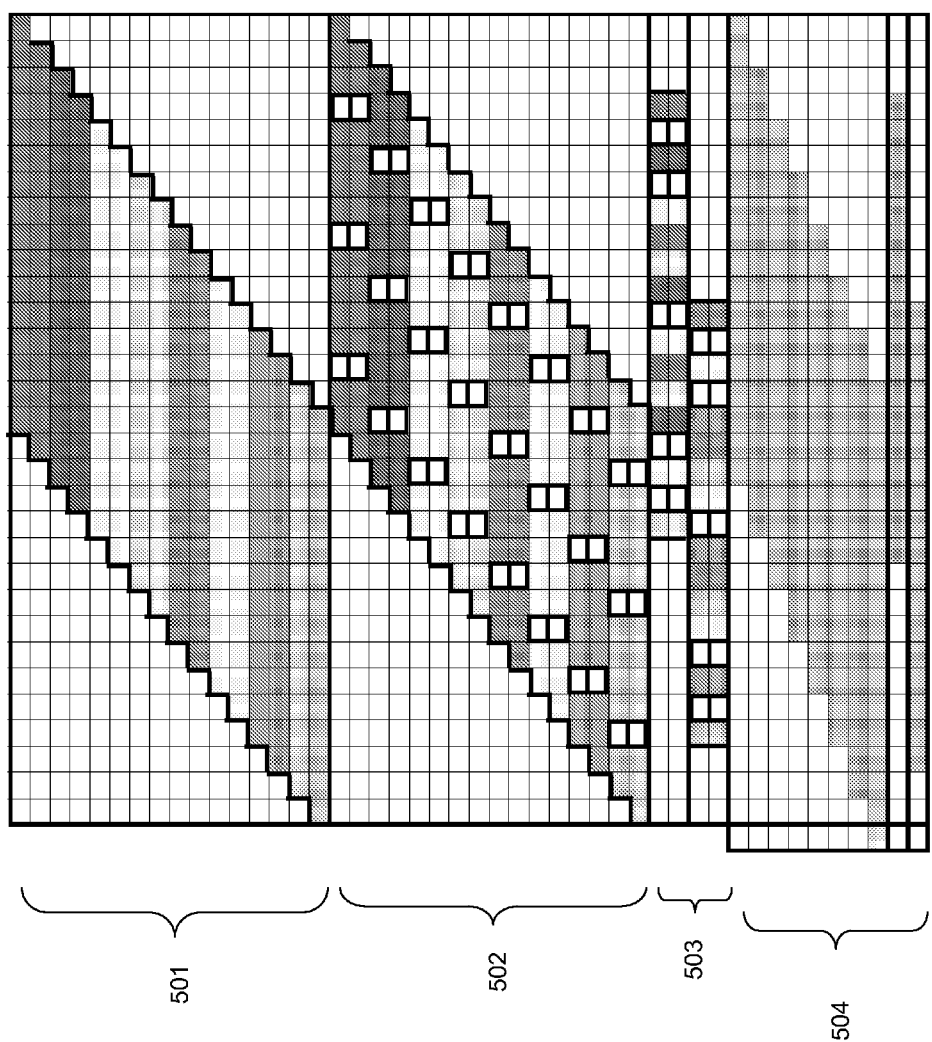

In some implementations, the carry arrest adder (or the block carry arrest adder) as described above may be used in a multiplication. FIG. 5 shows an example of how multiple bit numbers obtained in an intermediate step of a multi-bit multiplication may be added together. Particularly, in parallel multipliers, the partial products 501 to be added for the final result are shifted or staggered with respect to each other. In some implementations, the VLSI of a parallel multiplier could be generalized to implement a wide class of functions by programming its partial product array (PPA) to accept arbitrarily defined numbers. Such partial products may be added with each other using the carry arrest adder (or block carry arrest adders) by introducing gaps of zeros in the set 502 and moving the replaced bits to auxiliary sets 503. In the example shown in FIG. 5, 4 auxiliary sets are created for adding 16 partial products 501 resulting from a 16×16 bit multiplier. In this example, simultaneous additions of 4 bit numbers are needed with no carry propagation across the gaps replace the addition of 16 numbers 501 by 10 numbers 504. The resulting 10 numbers 504 may be added using the carry arrest adder (or the block carry arrest adder) a second time or may be added using any other adder. In this example, the resulting 10 numbers are obtained in a time needed to add two 4-bit numbers. Therefore, the time taken depends only on the length of the short segments (4 in this case), and not on the original number of bits (16 in this case). Therefore, the larger the number of bits in the partial products 501, the higher the relative increase in speed.

In some implementations, the multiplication may be a part of one of the following algorithms and/or functions: a divide and conquer algorithm, a vector multiplication, a matrix multiplication, a calculation of inner or outer product of vectors and any other operation that requires fast multi-operand adders. In some implementations, the multiplications are in fixed point arithmetic. In some implementations, the multiplications may be in floating point arithmetic. In such cases, the multiplication is computed using carry arrest (or block carry arrest) adder by computing the multiplication of the mantissas of the two multiplicands in fixed-point form, then adding the exponents, and finally performing final adjustment to put the mantissa in the proper form with possible minor adjustment of the exponent.

Figure 6:
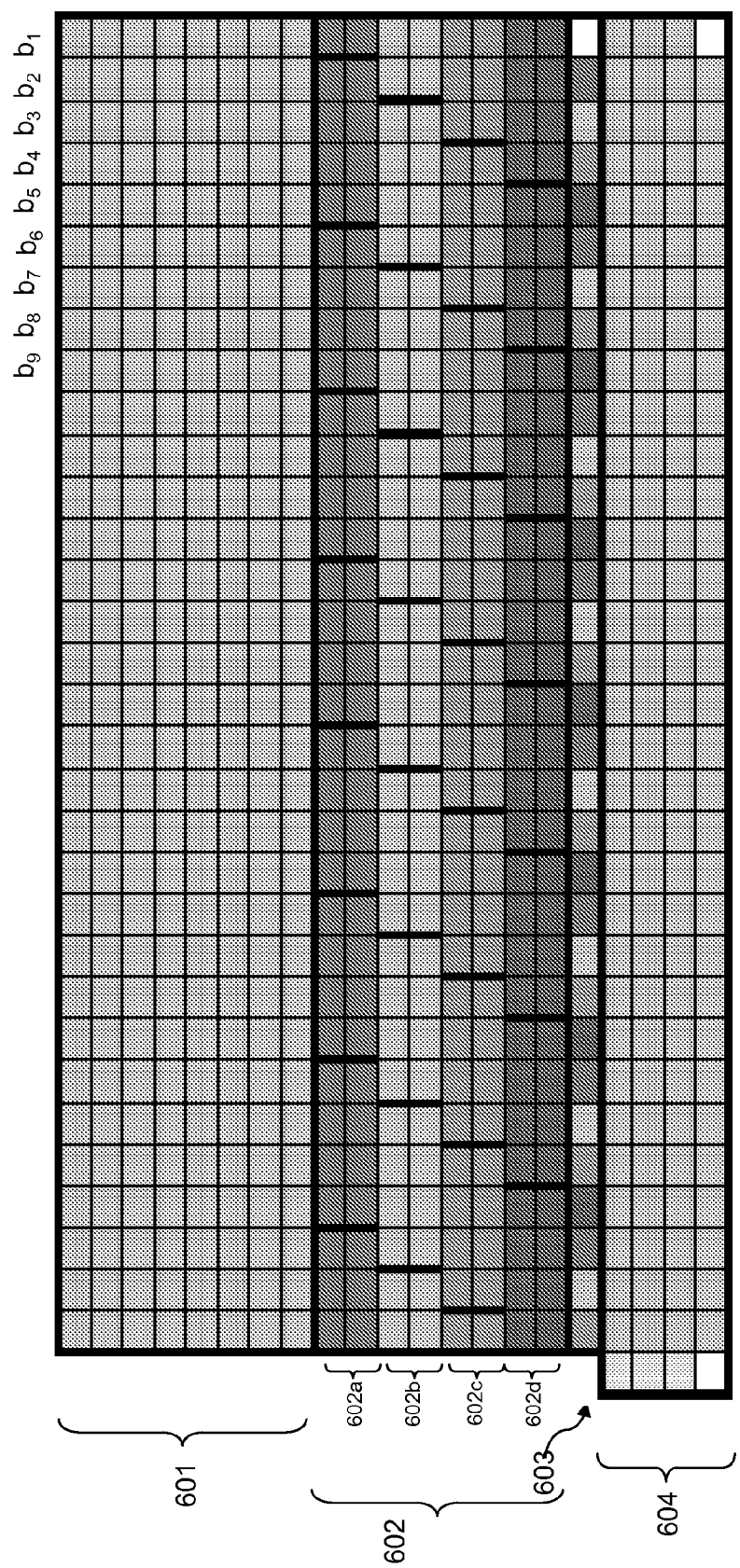

Referring now to FIG. 6, another exemplary scheme for performing multi-operand additions is shown. In this example, the summands 601 are 8 numbers of 32 bits each. The summands are paired up to form the set 602 of summands and each pair of summands is partitioned into shorter additions of 4 bit numbers and the partition is created without any gaps of zeros. For example, in the top pair of summands 602a of set 602, bit positions $b_2$, $b_3$, $b_4$ and $b_5$ is an example of a partitioned short addition of 4 bits. The partition into 4 bits is for illustrative purposes only and should not be considered limiting. The carry resulting from the short addition of four bits is placed in a corresponding bit position in the auxiliary array 603. For example, the carry that may result from adding the bit positions $b_2$, $b_3$, $b_4$ and $b_5$ of the pair 602a is placed at the bit position $b_6$ of the auxiliary array 603. The partitions from the other pairs 602b, 602c and 602d are done in such a way that they are staggered with respect to one another. The staggering is done in a way such that the carries from the short additions across all pairs 602 are placed in the auxiliary array 603 without overlap. For example, the carry that may result from adding the bit positions $b_3$, $b_4$, $b_5$ and $b_6$ of the pair 602b is placed at the bit position $b_7$ of the auxiliary array 603 and the carry that may result from adding the bit positions $b_4$, $b_5$, $b_6$ and $b_7$ of the pair 602c is placed at the bit position $b_8$ of the auxiliary array 603. For binary additions, the auxiliary array will have the carries from the different short additions in a binary form.

In this example, the number of 32 bit summands are reduced to 5, 33 bits summands, including the summands of the set 604 of partial sums resulting from the additions of the pairs 602 and the auxiliary array 603 representing including the carries. The reduction from 8 to 5 numbers is achieved in the time needed to add two 4 bit numbers and transfer the resulting carry (if any) to the auxiliary array 603. The time required is independent of the length of the original summands 601 (32 bits in this case). This adder is suitable for at least 4 summands, which are reduced to 3. In some implementations, the partitioning of the pairs 602 may be done in any manner as long as the resultant carries from the short additions occupy a unique bit position in the auxiliary array 603. In some implementations, the sets 602a-602d may be staggered with respect to one another by more than one bit position. In some implementations, more than one auxiliary array may be required to accommodate the resultant carries.

Even though the above adders have been described primarily with respect to binary numbers, the adders may be used with decimal, octal, hexadecimal and numbers of any other radix. Since the value of the carry when adding two numbers in any radix system is in $\{0,1\}$, more than two numbers sharing the same gap locations could be added without requiring more than one digit location to arrest the carry. For example, for radix R, up to R numbers sharing the same gap locations could be added with the maximum possible carry being R−1.

Applications of the adders described herein include, without limitation, the following. The carry arrest multi-operand adders could be implemented in hardware form as part of an advanced VLSI arithmetic unit, or in software form stored in a medium or executed by a computer system. In some implementations, the carry arrest adders could be implemented for multi-core systems. The high degree of parallelism renders the carry arrest adders suitable for multi-core implementation. The carry arrest adders could be used for fast computation of sums, multiplications, matrix multiplication, including inner and outer products. In some implementations, the carry arrest adders could be used for high dimensional with applications to image, digital and array processing and tensor based computations. The carry arrest adders may be used in computer graphics engines, video processing hardware, optical ray tracing apparatus and other systems requiring fast real time processing including fast additions. In some implementations, the carry arrest adders may be used for cryptography applications. Most cryptography applications use modular arithmetic with very large number of bits. While modular arithmetic allows for parallel computation for each modulus independently, the moduli are typically very large, and carries need to be handled efficiently for fast additions.

Figure 7:
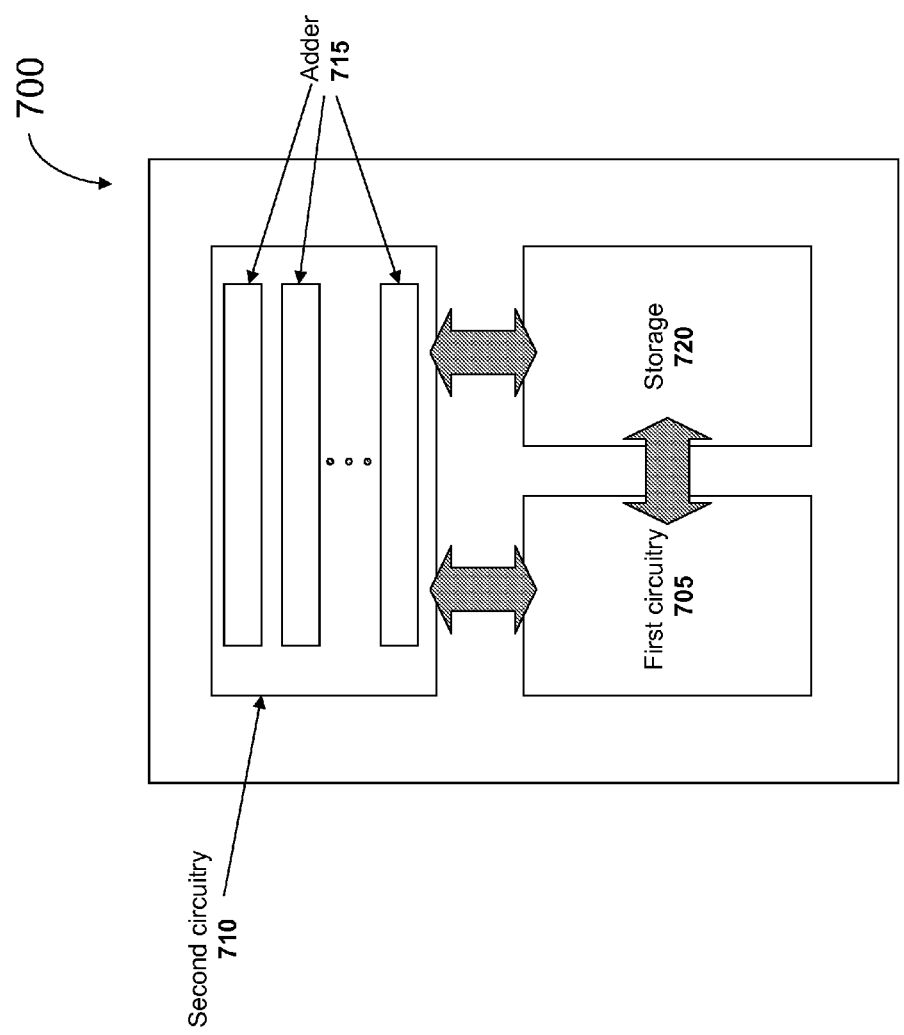
FIG. 7 is a diagram depicting a system for performing additions.

Referring now to FIG. 7, a system 700 for performing additions is shown and described. In some implementations, the system 700 includes a first circuitry 705, a second circuitry 710 and storage 720. The first circuitry 705 may include circuit elements for partitioning the multiple-digit sequences or summands into two or more sets of multiple-digit sequences. The sets of multiple-digit sequences may have two or more summands in each one of them. In some implementations, the partitioned sets are saved or stored in the storage 720. The first circuitry 705 may also include circuit elements for generating one or more auxiliary sets that include digits copied from respective digit positions of the sets of multiple-digit sequences. The first circuitry 705 may also include circuit elements for replacing one or more digits in the sets of multiple-digit sequences by zeros. In some implementations, the first circuitry further identifies short segments of numbers from the sets of multiple-digit sequences and provides the shorts segments to the second circuitry 710.

The second circuitry 710 may include one or more adders 715 that are capable of adding the short segments of numbers from the sets of multiple-digit sequences. For example, if the summands are 32 bit long, the first circuitry may identify 4-bit long segments from each pair of summands and provide them to the second circuitry 710 for implementing the addition of such segments. In some implementations, the short segments may include zeros at certain bit positions introduced by replacing an original bit in the corresponding position. The original bits, as mentioned above, are placed in one or more auxiliary sets. In some implementations, the adders 715 may all be of the same length. In other implementations, some of the adders 715 may be of a first length while other adders 715 may be of a different length. In some implementations, the addition of the short segments may be done in parallel. For example, if each of four 32-bit numbers to be added are broken down into 8 segments of 4-bits each, then 16 additions, each 4-bit long, will be required. If the hardware has 16, 4-bit adders available, the additions may be done in parallel in a time required to do one 4-bit addition. In other implementations, the addition of the short segments may be done in real time as the bits become available. For example, an algorithm may pre-define which bits of a given set are to be copied to an auxiliary set and replaced by zero. In such a case, the bits from the multiple-digit sequences may be allocated to the adders 715 as they become available and the addition performed as soon as an adder fills up to capacity. This allows for very fast real time addition, especially for large multiple-digit sequences, because partial sums are generated on the run even when the entire multiple-digit sequence is not completely available. In some cases, such real time computation is referred to as asynchronous computation.

In some implementations, the results from the adders 715 are stored in the storage 720. The results may be combined in the storage 720 to produce partial sums. In some implementations, the first circuitry 705 communicates with the storage 720 to store the partitioned and altered sets of multiple-digit sequences. The second circuitry 710 may further communicate with the storage 720 to retrieve multiple-digit sequences to process, possibly with the adders 715. In some implementations, the first circuitry stores all summands in the storage 720 before the second circuitry 710 accesses the summands to compute the additions of the short segments in parallel. In some implementations, the storage 720 stores the one or more auxiliary sets.

The first circuitry 705 may include circuit elements to perform, for example, arithmetic and logical operations. For example, the first circuitry 705 may include, without limitation, one or more of a microprocessor, a microcontroller, a clock circuit, a logic gate, an arithmetic logic unit, a random access memory, an accumulator, a counter, a digital signal processor or other analog and digital circuitry that may be configured to perform the operations described herein.

The second circuitry 710 may include any circuit element described with respect to the first circuitry 705. The second circuitry 710 may also include adders 715. The adders 715 may be of different forms and types. For example, an adders 715 may be a carry save adder, a carry select adder, a carry look ahead adder, an adder tree or any other multi-digit adder that may be configured to add two or more multi-digit segments.

The storage 720 includes memory to store digital data. The storage 720 may include, without limitation, an accumulator, a random access memory (RAM), a read only memory (ROM), a hard drive, a removable storage media or other forms of hardware that may be configured to store and provide access to digital data.

Many other implementations of the invention other than those described above are within the invention, which is defined by the following claims.

What is claimed is:

1. A method of generating partial sums from at least four multiple-digit sequences in a computing device, the method comprising:

partitioning, by a circuitry, the multiple-digit sequences into at least a first set of multiple-digit sequences and a second set of multiple-digit sequences;

generating, at least one auxiliary set of multiple-digit sequences that include digits copied from respective digit positions of multiple-digit sequences in the first and second sets;

replacing the copied digits in the first set by zeros to obtain a first altered set of multiple-digit sequences each comprising multiple segments separated by the replaced zeros;

replacing the copied digits in the second set by zeros to obtain a second altered set of multiple-digit sequences each comprising multiple segments separated by the replaced zeros;

generating, by an adder, at least a first partial sum by adding the multiple-digit sequences in at least one auxiliary set;

generating at least a second partial sum by adding the multiple-digit sequences in the first altered set; and generating at least a third partial sum by adding the multiple-digit sequences in the second altered set.

2. The method of claim 1, where generating at least one auxiliary set of multiple-digit sequences includes
copying digits from a first group of digit positions of each multiple-digit sequence in the first set to corresponding digit positions in a first auxiliary set, and
copying digits from a second group of digit positions of each multiple-digit sequence in the second set to corresponding digit positions in a second auxiliary set.

3. The method of claim 1, where adding the multiple-digit sequences in each of the first and second altered sets includes adding different segments of the multiple-digit sequences in parallel.

4. The method of claim 1, further comprising summing the partial sums.

5. The method of claim 1, wherein one or more zeros are appended at the beginning or end of one or more of the multiple-digit sequences in the first and second sets.

6. The method of claim 1 wherein the multiple-digit sequences are obtained via a multiplication of at least two numbers.

7. The method of claim 6, wherein the multiplication is one of a fixed-point multiplication and a floating point multiplication.

8. The method of claim 1, where generating at least one auxiliary set of multiple-digit sequences includes
copying digits from a first group of digit positions of each multiple-digit sequence in the first set to corresponding digit positions in a first auxiliary set, and
copying digits from a second group of digit positions of each multiple-digit sequence in the second set to corresponding digit positions in the first auxiliary set, where each of the digit positions in the first group of digit positions is different from the digit positions in the second group of digit positions.

9. The method of claim 8, where generating the auxiliary set further includes setting a third group of digit positions in the first auxiliary set to zero, the third group of digit positions corresponding to the digit positions not included in either of the first and second groups of digit positions.

10. The method of claim 8, wherein digit positions in the first group of digit positions are periodic with a first period, respectively, and wherein generating the first auxiliary set further includes setting a third group of digit positions in the first auxiliary set to zero, the third group of digit positions corresponding to the digit positions not included in either of the first and second groups of digit positions and wherein digit positions in the third group of digit positions are periodic with a third period.

11. The method of claim 8, wherein each of the first and second groups of digit positions include at least two digit positions that are consecutive.

12. The method of claim 11, where generating the first auxiliary set further includes setting a third group of digit positions in the first auxiliary set to zero, the third group of digit positions corresponding to the digit positions not included in either of the first and second groups of digit positions and wherein the third group of digit positions include at least two digit positions that are consecutive.

13. A method of generating partial sums from at least four multiple-digit sequences in a computing device, the method comprising:
partitioning, by a circuitry, the multiple-digit sequences into at least a first set of multiple-digit sequences and a second set of multiple-digit sequences;
generating, by an adder, at least a first partial sum by adding respective segments of the multiple-digit sequences in the first set, with two or more sets of segments of multiple-digit sequences of the first set being added in parallel;
generating at least a second partial sum by adding respective segments of the multiple-digit sequences in the second set, with two or more of the segments of multiple-digit sequences of the second set being added in parallel; and
generating at least one auxiliary set of multiple-digit sequences that include digits derived from respective carry results from additions of respective segments of the multiple-digit sequences in the first set and digits derived from respective carry results from additions of respective segments of the multiple-digit sequences in the second set.

14. The method of claim 13, wherein digits derived from the respective carry results from additions of the respective segments in the first set occupy bit positions in the auxiliary set corresponding to bit positions of the respective carry results in the first set.

15. The method of claim 14, wherein digits derived from the respective carry results from additions of the respective segments in the second set occupy bit positions in the auxiliary set corresponding to bit positions of the respective carry results in the second set.

16. The method of claim 15, wherein the bit positions of the respective carry results from additions of the respective segments in the first set are different from the bit positions of the respective carry results from additions of the respective segments in the second set.

17. The method of claim 13, further comprising adding the auxiliary set and the first and second partial sums.

18. A system for generating partial sums from at least four multiple-digit sequences in a computing device, the system comprising:
a first circuitry configured to:
partition the multiple-digit sequences into at least a first set of multiple-digit sequences and a second set of multiple-digit sequences,
generate at least one auxiliary set of multiple-digit sequences that include digits copied from respective digit positions of multiple-digit sequences in the first and second sets,
replace the copied digits in the first set by zeros to obtain a first altered set of multiple-digit sequences each comprising multiple segments separated by the replaced zeros, and
replace the copied digits in the second set by zeros to obtain a second altered set of multiple-digit sequences each comprising multiple segments separated by the replaced zeros; and
a second circuitry configured to:
generate at least a first partial sum by adding the multiple-digit sequences in the at least one auxiliary set,
generate at least a second partial sum by adding the multiple-digit sequences in the first altered set, and generate at least a third partial sum by adding the multiple-digit sequences in the second altered set.

19. The system of claim 18, wherein at least one of the first circuitry and the second circuitry comprises a processor and the second circuitry further comprises an adder circuit.

20. The system of claim 18, wherein the first circuitry is further configured to:
- copy digits from a first group of digit positions of each multiple-digit sequence in the first set to corresponding digit positions in a first auxiliary set, and
- copy digits from a second group of digit positions of each multiple-digit sequence in the second set to corresponding digit positions in the first auxiliary set, where each of the digit positions in the first group of digit positions is different from the digit positions in the second group of digit positions.

21. The system of claim 20, where generating the auxiliary set further includes setting a third group of digit positions in the first auxiliary set to zero, the third group of digit positions corresponding to the digit positions not included in either of the first and second groups of digit positions.

22. The system of claim 18, wherein the first circuitry is further configured to:
- copy digits from a first group of digit positions of each multiple-digit sequence in the first set to corresponding digit positions in a first auxiliary set, and
- copy digits from a second group of digit positions of each multiple-digit sequence in the second set to corresponding digit positions in a second auxiliary set.

23. The system of claim 18, wherein the second circuitry is further configured to add the partial sums.

24. A computer-readable memory storing a computer program for generating partial sums from at least four multiple-digit sequences, the computer program comprising instructions for causing a computer system to:
- partition the multiple-digit sequences into at least a first set of multiple-digit sequences and a second set of multiple-digit sequences;
- generate at least one auxiliary set of multiple-digit sequences that include digits copied from respective digit positions of multiple-digit sequences in the first and second sets;
- replace the copied digits in the first set by zeros to obtain a first altered set of multiple-digit sequences each comprising multiple segments separated by the replaced zeros;
- replace the copied digits in the second set by zeros to obtain a second altered set of multiple-digit sequences each comprising multiple segments separated by the replaced zeros;
- generate at least a first partial sum by adding the multiple-digit sequences in at least one auxiliary set;
- generate at least a second partial sum by adding the multiple-digit sequences in the first altered set; and
- generate at least a third partial sum by adding the multiple-digit sequences in the second altered set.

* * * * *